Figure 1:
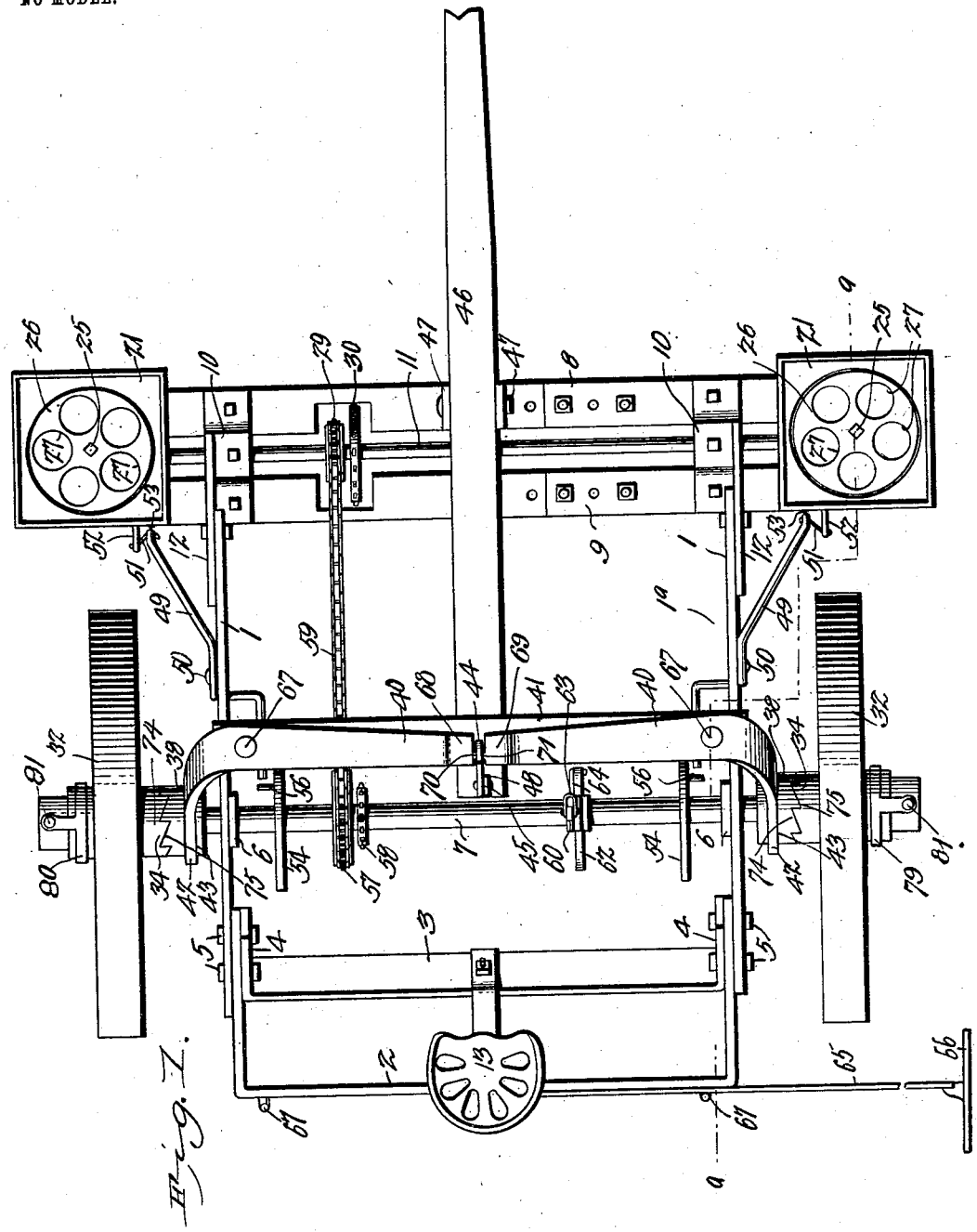

No. 722,966. PATENTED MAR. 17, 1903.
J. P. FOX.
CHECK ROW CORN PLANTER.
APPLICATION FILED AUG. 18, 1902.
NO MODEL. 2 SHEETS—SHEET 1.

Witnesses
J. P. FOX, Inventor.
by C. A. Snow & Co.
Attorneys

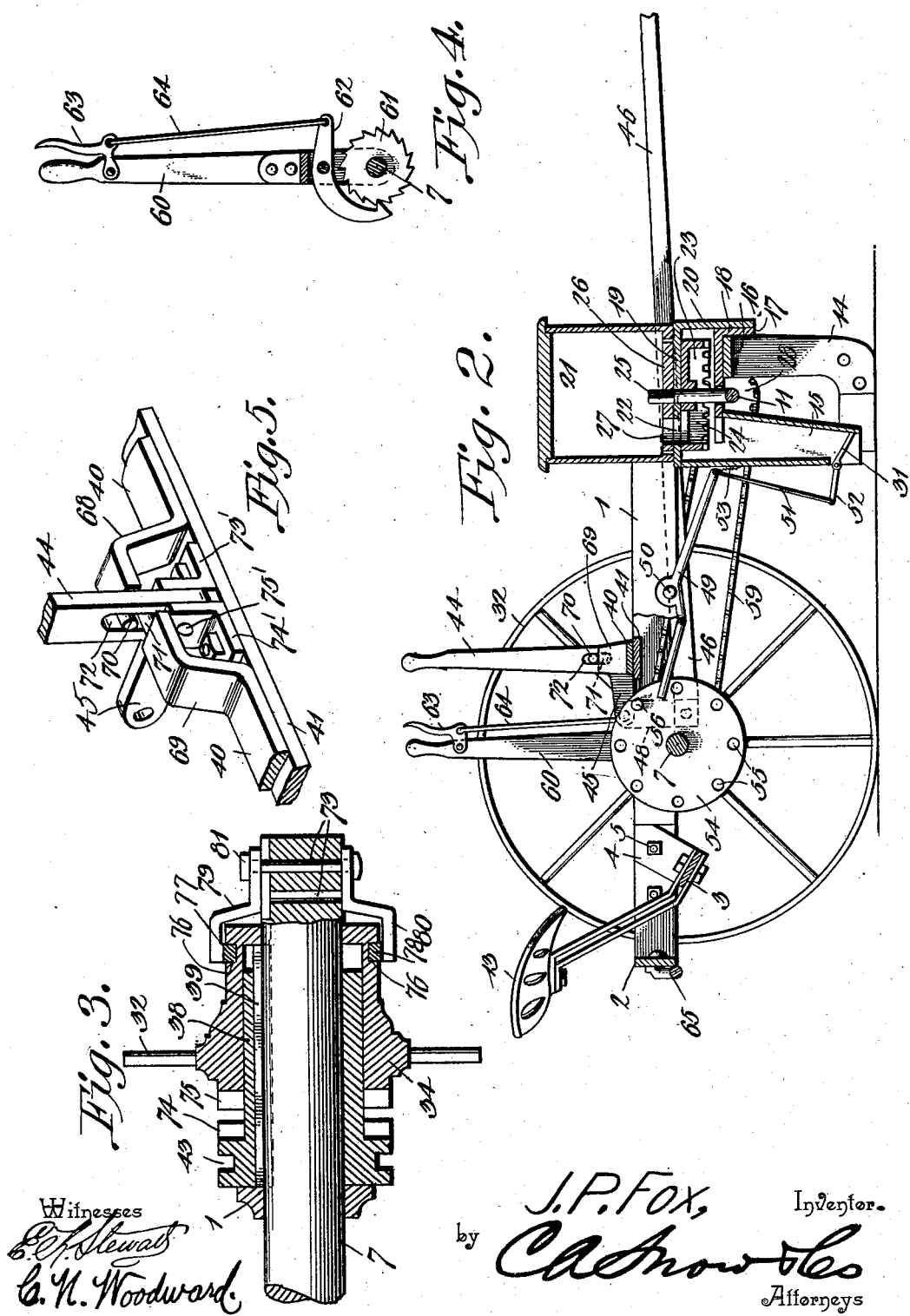

UNITED STATES PATENT OFFICE.

JOHN P. FOX, OF AUDUBON, PENNSYLVANIA.

CHECK-ROW CORN-PLANTER.

SPECIFICATION forming part of Letters Patent No. 722,966, dated March 17, 1903.

Application filed August 18, 1902. Serial No. 120,079. (No model.)

*To all whom it may concern:*

Be it known that I, JOHN P. FOX, a citizen of the United States, residing at Audubon, in the county of Montgomery and State of Pennsylvania, have invented a new and useful Check-Row Corn-Planter, of which the following is a specification.

My invention is an improved check-row corn-planter; and it consists in the peculiar construction and combination of devices hereinafter fully set forth and claimed.

The object of my invention is to provide an improved check-row corn-planter which may be operated without the use of a wire and anchoring devices and which is adapted to be adjusted from time to time, as may be required, to cause the hills to be planted in check-rows.

In the accompanying drawings, Figure 1 is a top plan view of a check-row corn-planter embodying my improvements. Fig. 2 is a vertical longitudinal sectional view of the same, taken on a plane indicated by the line *a a* of Fig. 1. Figs. 3 and 4 are detail sectional views, and Fig. 5 is a detached perspective view of the coupling between the operating-levers.

The frame is here shown as comprising a pair of side bars 1 and a cross-bar 2 in the form of a yoke, which connects the rear ends thereof together. A drop-bar 3 is disposed transversely in advance of the yoke and has its upturned arms 4 secured to the sides of the yoke by the bolts 5, which also secure the yoke to the side bars 1. The side bars 1 are provided at points intermediate their ends with bearings 6, in which is journaled the axle-shaft 7. A pair of cross-bars 8 9 are disposed at the front end of the frame and are connected together by bars 10, which form bearings for a shaft 11. The said bars 10 are connected to the front ends of the bars 1 by bars 12, which are bolted to the bars 10 and bars 1, respectively. The drop-bar 3 carries a seat 13.

At the ends of the front cross-bar 8 are connected the furrow-opening shoes or runners 14, which depend therefrom. The lower ends of the seed-spouts 15 are secured to the rear portions of the said furrow-opening shoes or runners. On the ends of the cross-bar 8 are outwardly-extending arms 16, each of which supports a plate 17, having its front side downturned to form a flange 18. A plate 19 is associated with and above each of the plates 17, and each plate 19 has its front side downturned to form a flange 20, which is secured to the flange 18 of its companion plate 17. The said plates 19 form the bottoms of hoppers 21 and are each provided with an opening 22, disposed at the upper end of and communicating with one of the seed-spouts 15. Under each plate 19 is a gear-wheel 23, which is spoked or of open construction and is provided on its under side with crown-teeth 24. Said gears 23 are revoluble with vertical shafts 25, which have their bearings in the plates 17 19, and the upper ends of which are preferably angular in cross-section and adapted to carry removable revoluble seed-plates 26, each of which is provided with a suitable number of seed cups or openings 27 of suitable capacity, which seed cups or openings successively register with the openings 22 when the seed-plates are revolved, and thereby cause seeds to be dropped through said openings and through openings in the gear 23 into the seed-spouts 15. The shaft 11 is provided with spur-gears 28 at its ends, which engage the crown-gears 24, and hence it will be understood that the seed-dropping plates will be revolved when the said shaft 11 is rotated. The said shaft 11 is provided with sprocket-wheels 29 30, which differ in size, their object and function to be hereinafter explained. In the lower end of each seed-spout 15 is a pivotally-mounted accumulating-valve 31. The said valves normally close the lower ends of the seed-spouts.

On the spindles near the outer ends of the axles are respectively arranged splines or feathers 39, extending inwardly to the side bars 1, and formed through the outer ends of the axles beyond the splines 39 are one or more perforations 73, as shown in Fig. 3, which represents an enlarged sectional detail of the clutch mechanism here referred to.

Engaging the spindles of the axles opposite the splines 39 are sleeves 38, each having a longitudinal groove engaging its respective spline, as shown at the upper side of Fig. 3, so that while free to move longitudinally of the axle, the sleeves will be carried around with the axle.

The sleeves 38 are formed at their rear ends with enlargements having annular channels 43, which the shipper-levers will operate, as hereinafter shown. Upon the outer faces of the enlargements of the sleeves are respectively formed radiating spaced ratchet-teeth 74, as shown.

The hubs 34 of the traction-wheels 32 revolubly engage the outer surfaces of the sleeves 38, respectively, the sleeves forming the bearings for the traction-wheels. The inner faces of the hubs of the traction-wheels are provided with spaced radiating ratchet-teeth 75, corresponding to and adapted to engage the ratchet-teeth 74 on the sleeve 38.

The outer ends of the hubs 34 are formed with annular grooves 76, and in these annular grooves are fitted segmental members 77 78 of clips 79 80, the latter attached upon opposite sides of the axle end by a bolt 81 passing through one of the perforations 73 in the axle. By this simple means the hubs of the wheels will be firmly locked from longitudinal movement on the axle, but will be free to revolve beneath the segmental holding members 77 78 upon the sleeves 38, as will be understood. By this simple means also it will be understood that the wheels 32 will revolve loosely upon the sleeves 38 so long as the latter are withdrawn from engagement therewith; but when the sleeves are thrown outwardly by the shipper-levers acting in the annular grooves 43 the ratchet-teeth 74 75 will be engaged and the traction-wheels thereby connected with the axle to partake of its motion.

The clips 79 80 are very easily removable by simply removing the bolts 81 to release the traction-wheels when required.

Bell-cranks 40 are fulcrumed at 67 on the cross-bar 41, which connects the side bars 1 of the frame, and have their outer ends or arms 42 forked and engaged with the annular grooves 43 in the clutches. The inner ends of the said bell-cranks are turned upward at their inner ends at 68 69 on opposite sides of a lever 44 and provided with pins 70 71, extending, respectively, from the ends and passing in opposite directions one above the other through a slot 72 in the lever 44, as shown more clearly in Fig. 5, which represents this part of the device in detail and detached.

The lever 44 is fulcrumed at its elbow between ears 73' 74' by pivot 75' on the cross-bar 41 and is connected by its rearwardly-extending arm 45 by a link 48 to the inner end of the draft-tongue 46, the latter fulcrumed between ears 47 to the cross-bar 8, as shown, and extends forwardly for the usual distance. The draft-tongue thus forms a lever with the rear end connected to the arm 45 of the hand-lever 44 by a link 48. It will be understood that the front end of the draft-tongue will be connected to the collars of the team and that by operating the hand-lever 44 the front portion 8 8 of the main frame, which carries the furrow-opening shoe, seed-spouts, and seed-dropping mechanisms, may be raised and lowered. The same movement of the lever 44 which operates the tongue 46 likewise acts upon the pins 70 71 in the slot 72, and thus correspondingly operates the levers 40 simultaneously and moves the clutch members 38, as will be understood. Thus when the lever 44 is operated to elevate the furrow-openers from the ground the clutches will be reversely operated to disconnect the traction-wheels from the operating mechanism, and thus throw the operating mechanism out of gear when not required.

The levers 49 are fulcrumed to the side bars 1, as at 50, and project forwardly and rearwardly from their pivots 50 and have their front ends connected by rods 51, with which arms 52, extending rearwardly from the accumulating-valves, are engaged. Springs 53, which are here shown as coiled retractile springs, draw downwardly on the front ends of the levers 49 and keep the accumulating-valves normally closed. On the axle-shaft 7 and revoluble therewith are disks 54, each of the disks being provided with a suitable number of adjusting-openings 55, approximately spaced apart, and in the said openings may be inserted one or more tappet-pins 56, according to the distance desired between the hills in the rows. The rear arms of the levers 49 are disposed in the paths of the said tappet-pins, and it will be understood that when the machine is advancing the accumulating-valves will be automatically opened a predetermined number of times at each revolution of the traction-wheels 32 to cause the seeds to be dropped from the seed-spouts into the furrows at corresponding intervals, and hence enable the seeds to be planted at regulated distances apart. The axle-shaft 7 is provided with sprocket-wheels 57 58, which vary in size and correspond to and are placed in alinement with the sprocket-wheels 29 30 on the shaft 11, the wheels 29 58 corresponding in size and the wheels 57 30 corresponding in size. The wheels 57 29 are in alinement and the wheels 58 30 are in alinement, so that a connecting-chain 59 may be alternately conducted between them, as shown at 59, to vary the speed, as will be understood. By this means the speed of the seed-dropper mechanism may be varied to correspondingly vary the number of seeds dropped into the seed-spouts by the action of the accumulating-guards, so that the number of seeds planted in each hill may be regulated as may be desired.

It is of importance to enable the seed-dropping mechanisms to be manually operated by the driver in order to approximately set the machine, as may be required, to cause the hills to be planted in check-rows. To effect this, I provide a hand-lever 60, the lower end of which is pivoted or rotatable on the axle-shaft, secure a ratchet-wheel 61 on the said axle-shaft, and provide the lever 60 with a pawl 62 to engage said ratchet-wheel, and hence enable the shaft 7 to be located when the machine is standing still. To enable the pawl to be engaged with and disengaged from the ratchet-wheel at will, I provide a handgrip 63, which is connected to the forwardly-extending arm of the pawl by a rod 64.

On the rear side of the yoke 2, at the center thereof, is pivoted the inner end of a marker-bar 65, which carries a marking-shoe 66 at its outer end and is adapted to be thrown to either side of the machine and is of approximate length to cause the marking-shoe to mark the adjacent row at the proper distance to one side of one of the rows in course of planting. Hook-supports 67 are provided, which are attached to the yoke 2 and serve to support the marker-bar when the same is in use.

Having thus described the invention, what is claimed is—

1. In a planter, the main frame, an axle-shaft rotatively engaging said frame, traction-wheels rotatively engaging said axle-shaft, clutches adapted to lock the traction-wheels to the axle-shaft, means for operating said clutches, seed-dropping mechanisms supported from said frame, operating means between the axle-shaft and the seed-dropping mechanisms, a draft element movably attached to the main frame and forming a lever connection thereto, and connecting means between said lever draft element and said clutch-operating means.

2. In a planter, a main frame, an axle-shaft rotatively engaging said frame, traction-wheels rotatively engaging said axle, clutches adapted to lock the traction-wheels to the axle-shaft, levers movably engaging said frame and connected to operate said clutches, seed-dropping mechanisms supported from said frame, operating means between the axle-shaft and the seed-dropping mechanisms, a draft element movably attached to the main frame and forming a lever connection thereto, a lever supported on said frame and connected to operate said lever draft element, and means connecting said draft element lever with said clutch-levers.

3. In a planter, the main frame, an axle-shaft rotatively engaging said frame, traction-wheels rotatively engaging said axle-shaft, clutch members rotatable with said traction-wheels, the opposite clutch members slidably disposed upon said axle-shaft and partaking of its motion and adapted when operated to engage the clutch members on said traction-wheels, operating-levers movably engaging said frame and adapted to operate said slidable clutch members, a draft element movably attached to the main frame and forming a lever connection thereto, a lever movably connected to said frame and adapted to operate said lever draft element, and provided with an aperture adapted to movably engage the extended ends of said clutch-operating levers, seed-dropping mechanisms supported from said frame, and operating means between the axle-shaft and the seed-dropping mechanisms, substantially as described.

In testimony that I claim the foregoing as my own I have hereto affixed my signature in the presence of two witnesses.

JOHN P. FOX.

Witnesses:
 O. F. LENHARDT,
 ROSA R. FOX.